DETERMINATION OF ADDITIVE CARBON

Catalyst-Equilibrium
Temp.-1000°F
Reactor Temp., 4 sec.
Unit-Riser Reactor

United States Patent Office 3,791,962
Patented Feb. 12, 1974

3,791,962
SELECTIVE CATALYTIC CRACKING WITH CRYSTALLINE ZEOLITES
Edward J. Demmel, Pitman, and Hartley Owen, Belle Mead, N.J., assignors to Mobil Oil Corporation
Filed Apr. 22, 1971, Ser. No. 136,452
Int. Cl. B01j 9/20; C10g 37/02
U.S. Cl. 208—80  7 Claims

ABSTRACT OF THE DISCLOSURE

The invention defined pertains to the catalytic cracking of hydrocarbon charge materials in a dual cracking system which segregates the charge on the basis of aromatic index (AI) rating before contact with a highly active and selective crystalline aluminosilicate cracking catalyst so that material having an AI rating below 15 will be converted under significantly different conditions from material having a higher AI rating.

BACKGROUND OF THE INVENTION

Various commercial processing operations in the petroleum and chemical fields have utilized fluidized catalyst system in different arrangements and combinations for effecting the catalytic conversion of hydrocarbons. These fluidized solids systems generally employ two or more different vessels provided with interconnecting solids transfer lines for effecting transfer of finely divided solids in a fluid medium chemical reaction and solids regeneration. The solids or catalyst particles in finely divided form and preferably of a fluidizable particle size are caused to move through transfer conduits with inert or reactant gasiform material from one zone to another in a pressure balanced operation. Fluidized solids systems as typified by a fluid catalytic cracking operation are known to include dilute and dense phase catalyst reaction zones, transfer line cracking and catalyst regeneration zones, dense fluid bed catalyst reaction zones and combinations thereof.

In effecting the catalytic cracking of hydrocarbons, one purpose of the process combination is to effect the conversion of relatively heavy hydrocarbon feed material with the aid of an active and selective catalyst composition into particularly desired lower boiling products such as gasoline, jet fuels and light fuel oil boiling range materials. It has been a continuous aim in the development of fluid cracking technology to improve upon the efficiency of the cracking process and the catalyst selectivity employed therein by a combination of technological advances designed particularly to maximize the yield of desired gasoline product. In such processes the depth of conversion of the oil charge during the cracking operation depends upon the severity of the operation which is a function of catalyst activity, catalyst selectivity, temperature, pressure, space velocity conditions and hydrocarbon charge employed in the cracking operation. Generally as the depth of conversion is increased from a low conversion level the gasoline yield will rise, pass through a maximum and then fall off. Coke production, on the other hand, is found to be a function of catalyst selectivity and activity which generally increase as the depth of conversion is increased. Thus in fluidized catalyst operations, the activity and selectivity of the catalyst employed greatly affect the method and manner of operating the system in which a particular catalyst composition is employed.

In cracking operations employing finely divided solid catalyst compositions comprising amorphous silica-alumina cracking catalysts or crystalline aluminosilicate cracking catalysts and combination thereof the amount and type of cracking component utilized will measurably effect the cracking operation in which the catalyst is used. Thus the efficiency of an operation can be optimized with particular catalyst compositions.

It is known at this stage of the cracking art that crystalline aluminosilicate catalyst compositions are much more active and much more selective than amorhpous silica-alumina cracking catalysts when properly utilized for effecting conversion of hydrocarbons. The activity-selectivity characteristics of various crystalline aluminosilicate containing catalyst compositions has thus necessitated a considerable further study of the fluid catalytic cracking technology and this study has led to significant improvements in operating efficiency going far beyond that recognized and considered possible by the prior art.

SUMMARY OF THE INVENTION

The present invention is concerned with the catalytic conversion of hydrocarbons. It is particularly concerned with identifying the operating technique which will be more effective in utilizing a highly active and selective crystalline aluminosilicate cracking catalyst in a fluid catalytic cracking operation to produce desired gasoline product materials. More particularly the present invention is concerned with operating a fluid catalytic cracking operation utilizing crystalline aluminosilicate cracking catalyst compositions of unique activity and selectivity characteristics in combination with hydrocarbon charge materials segregated for selective cracking thereof on the basis of the aromatic index rating and additive coke characteristics of the hydrocarbon charge materials.

DISCUSSION OF SPECIFIC EMBODIMENTS

It has been found, according to this invention, that a significant improvement in hydrocarbon conversion efficiency to gasoline product utilizing a high activity crystalline aluminosilicate containing catalyst composition can be realized by separately processing selected hydrocarbon fractions on a basis of their aromatic index rating. Thus a hydrocarbon charge material having an aromatic index (AI) rating below about 15 and preferably not above about 10 may be more selectively converted to gasoline product with a highly active crystalline aluminosilicate cracking catalyst when maintained under particularly selected processing conditions. It has also been found that hydrocarbon fractions having an aromatic index greater than about 15 and/or a hydrocarbon charge having what is known as high additive coke characteristics can also be more effectively converted when particularly selected conditions are employed with a high activity crystalline aluminosilicate cracking catalyst. It has been found, for example, that coker derived stocks and recycle stocks having high AI ratings as well as high additive coke characteristics can be beneficially converted more selectively when one converts as a function of the aromatic index of these charge stocks.

In the concept of this invention it has been found that the lower aromatic index (AI) rated hydrocarbon feed stocks, that is, those having an aromatic index (AI) rating below about 15 AI and preferably not more than 10 AI can be converted in a fluid catalyst cracking operation with considerably greater selectivity when employing a relatively dilute catalyst phase comprising a catalyst to oil ratio in the range of 4 to 8 to 1 in a riser reactor under selected conditions of feed preheat, conversion temperature, space velocity and catalyst-hydrocarbon suspension residence time in the riser. In such an operation, the time that the catalyst is in contact with the hydrocarbon as a suspension in the riser reactor is limited to be within the range of from about 2 to about 6 seconds and preferably is at least 3 seconds. Selectivity of the operation is further promoted by using the low catalyst to oil ratio above identified in conjunction with cracking temperatures selected from within the range of 880 to 1050° F. obtained in part by using a relatively high feed preheat temperature in the range of 600 to 800° F. before contact with the high activity crystalline aluminosilicate cracking catalyst. A relatively high aromatic index feed material or charge stock such as obtained from virgin coker and recycle stocks and having an AI rating in excess of about 15 is beneficially converted, on the other hand, when employing a high catalyst to oil ratio selected from within the range of 8 to 20 to 1 and preferably at least 10 to 1. In the high AI feed operation a low feed preheat temperature in the range of 100 to 500° F. is usually employed before the feed is brought in contact with the crystalline aluminosilicate conversion catalyst for passage as a relatively dense suspension by virtue of the higher catalyst to oil ratio employed upwardly through a separate riser cracking zone at a suspension residence time selected from within the range of 2 to 6 seconds. In this operation it is particularly desirable to severely restrict the time of contact of the high AI feed fraction and/or high additive coke fraction with the catalyst particles in the riser in combination with high conversion temperatures in the range of 925 to 1100° F. Thus the dense phase suspension will generally be at a higher temperature than the dilute phase riser phase but it may be at substantially the same temperature.

In the selective cracking operation of this invention, the high catalyst to oil ratio in combination with low feed preheat is employed to control the conversion of the high AI or high additive coke charge material at a residence time equal to or less than that employed to convert the low AI charge fraction. On the other hand, the space velocity of the suspension or catalyst hydrocarbon mixture used to convert the low AI hydrocarbon charge material may be equal to but is usually less than the space velocity employed for converting the high AI feed.

In the concept of the present invention, a distinction is recognized between (1) low aromatic index, below 10, charge stock, (2) high aromatic index, above 15, charge stocks and (3) charge stocks which have high coking characteristics. In the method comprising this invention, the high aromatic index material greater than 15 AI in combination with high additive coke characteristics is processed under similar conditions which may or may not be accomplished together or in separate riser reactors. In such an operation care is taken to avoid a hydrocarbon-catalyst contact in excess of 6 seconds and preferably it should be as short as possible.

Thus, the method of cracking comprising this invention and herein defined employs the highly active crystalline aluminosilicate cracking catalysts to crack the low aromatic index (AI) hydrocarbon charge material employing a catalyst to oil ratio in the range of 4–8, at a temperature in the range of 880 to 1050° F. using a space velocity within the range of 8 to 50 v./v./hr. in combination with a feed preheat temperature in the range of 600° F. to about 850° F. The operating condition for processing the high AI charge material and/or the high additive coke charge material, on the other hand employs catalyst/oil ratios preferably greater than 10, at higher conversion temperatures in the range of 925 to 1100° F. by a combination of feed preheat temperature in the range of 100 to 550° F. with hot catalyst at space velocities selected from within the range of 20 to 100 v./v./hr.

In practicing the concept of this invention it is intended using at least two or more separate riser reactors for processing the hydrocarbon reactant materials of different AI rating. It is also intended that riser reactors of the same or different length and of the same or a different diameter whichever becomes most convenient be employed to provide the differences in desired velocity conditions above defined. In this riser cracking or conversion environment it is contemplated that one may employ straight or tapered reactor designs in combination with expanding velocity reducing means such as a conical section adjacent the reactor outlet and which is particularly designed for providing desired discharge suspension velocities.

In the operation comprising the method of this invention, particular feed stock preparation for aromatic index segregation is obtained by passing a virgin charge material, for example, through a combination of atmospheric and vacuum distillation towers. In this combination the aromatic index and additive coke characteristics of the hydrocarbon fractions to be processed can be controlled with a high degree of particularity. For example, with some hydrocarbon charge stocks a low aromatic index and additive coke hydrocarbon fraction may be obtained from upper trays of a vacuum distillation tower which then can be blended with a lower aromatic index (AI) cracking charge recovered from, for example, an atmospheric distillation tower. The various fractions thus recovered on a basis of aromatic index and additive coke may then be selected for blending and processing to provide the desired low AI feed stock below about 15 AI separate from a higher AI blended hydrocarbon feed stock. Furthermore, some low additive coke hydrocarbon compositions may be recovered from other sources and combined with the low AI virgin charge material for processing as herein defined.

In a specific method of the concept defined herein, for example, a fresh relatively low aromatic index feed material having an AI rating below about 15 and preferably not more than about 10 is preheated to an elevated temperature in the range of from about 600° F. to about 850° F. This preheated fraction is then combined with hot finely divided high activity crystalline aluminosilicate cracking catalyst herein defined to form a suspension providing a catalyst to oil ratio in the range of 4 to 8 as required to provide a cracking temperature in the riser above 880° F. The thus formed suspension is passed upwardly through a riser reactor of selected length and diameter which will provide for a contact time selected from within the range of 2 to about 6 seconds and preferably at least 3 seconds. The cracking temperature of the low AI charge is maintained above about 880° F. and may be as high as 1050° F. depending upon the amount of preheat and catalyst employed. Of course more than one riser reactor may be used in combination or parallel relationship for converting the low and high AI charge material. The suspension comprising cracked products of reaction formed in the low AI feed riser is then separated under condition to inhibit further cracking beyond the selected cracking time within the riser and particularly before coming in contact with an atmosphere of different conditions such as one comprising significant levels of moisture provided for example by stripping steam or an atmosphere which will permit a further cracking of the hydrocarbon product of the riser cracking. Thus the suspension comprising cracked products of the above defined selective cracking operation pass immediately or directly from the riser reactor into a separator chamber of restricted dimensions and designed to separate catalyst from hydrocarbon vapors such as cyclone separators. Thus the separation and recovery of hydrocarbon vapors from catalyst particles in the absence of any significant further conversion is an important aspect of this invention. It is also significantly important that separation of hydrocarbon conversion vapors from catalyst be accomplished before the catalyst comes in contact with different atmospheric conditions.

The conversion conditions for cracking the hydrocarbon charge material having an aromatic index rating above 10 and particularly above 15 are of a significantly different severity from that imposed upon the low AI feed material. The high aromatic charge material and/or high additive coke charge, for example, is preheated to a temperature selected from within the range of from about 100 up to about 550° F. before being combined with the high activity crystalline aluminosilicate cracking catalyst in a desired catalyst to hydrocarbon ratio and which has also been preheated as by regeneration to an elevated cracking temperature equal to or greater than about 925° F. Cracking of the high aromatic index hydrocarbon charge material either alone or in the presence of high additive coke hydrocarbon fractions is intended to be accomplished at a temperature selected from within in the range of 925° F. up to about 1100° F. at catalyst-hydrocarbon residence time in a reactor design sized to restricted contact time within the range of 2 to 6 seconds. In this particular operation, the catalyst to oil ratio is considerably higher than that employed to convert the low AI feed material and it is maintained within the range of 8 to 20 preferably above about 10 with the higher catalyst to oil ratios being used particularly for processing the high additive coke charge materials.

In order to more fully understand and have a better appreciation for the particular combination comprising the concept and method of the present invention, the following discussion and examples are presented.

FIG. 1 is a plot of data obtained on the carbon yield in percent wt. based on fresh feed for different catalyst to oil ratios. It identifies a relationship for determining the additive carbon in percent wt. based on FF for a given catalyst and feed stock.

FIG. 2 is a plot representative of the percent wt. additive carbon as a function of the correlation parameter: (percent nitrogen×average molecular weight of the feed/14). It provides an empirical method for correlating the yield of additive carbon with feed stock properties.

FIG. 3 shows the effect of reaction temperature on the yield of additive carbon and plots a coking factor to be taken into consideration for temperatures other than 900° F. when the coke factor is 1. It is used in conjunction with FIG. 2 to predict the yield of additive carbon.

FIG. 4 is a diagrammatic arrangement of one arrangement of apparatus and processing system which may be used for practicing the concept of segregated cracking as defined herein.

BRIEF DESCRIPTION OF THE DRAWING

Having thus provided a general discussion of the present invention and discussed specific embodiments going to the essence thereof, reference is now had to FIG. 4 which presents one arrangement of apparatus for practising the concepts of this invention.

In the drawing, a regenerator 2 is shown which is provided with a dense fluidized bed of CAS containing cracking catalyst 4 of desired high activity as herein discussed. Cyclone separators such as represented by 6 are provided in the upper portion of the regenerator vessel for separating catalyst fines from regeneration flue gas. The separated fines are returned to the catalyst bed by dip leg 8. Flue gas freed of catalyst fines is removed from the upper part of the regenerator by conduit 10 containing valve 12.

Figure 1:
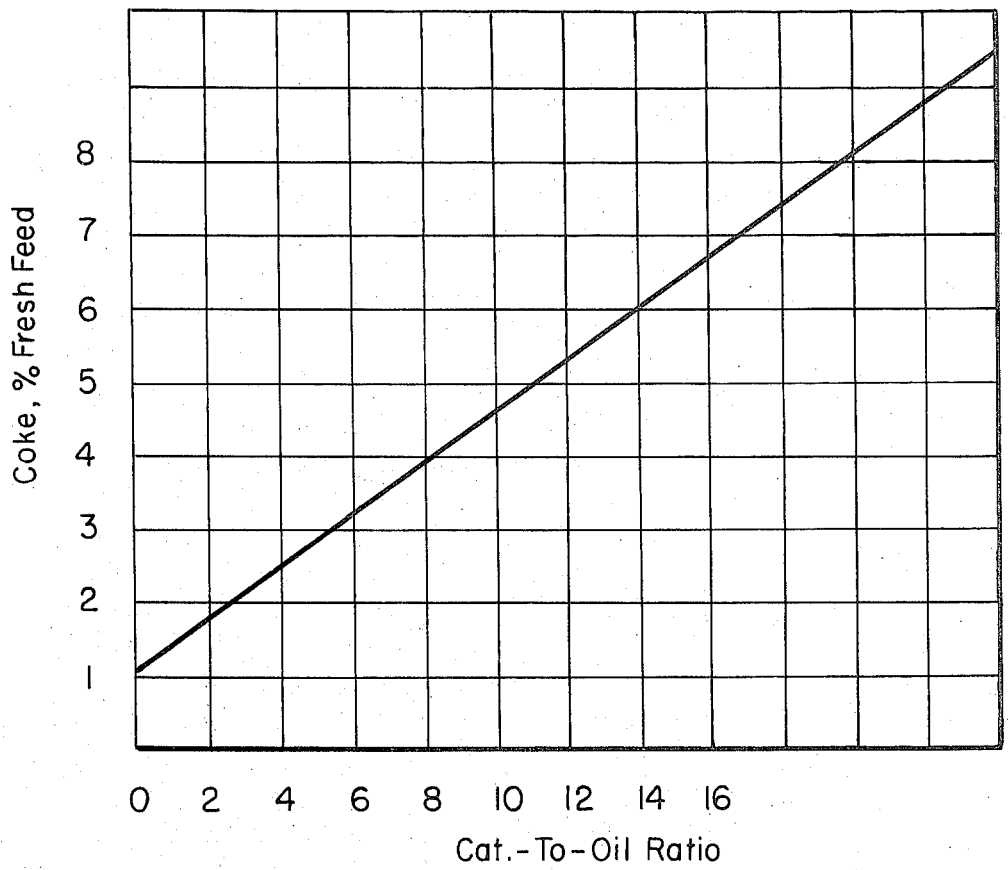

Regeneration gas such as air or an oxygen modified gas stream is introduced by way of conduit 14 to a heater such as an air line heater known in the prior art. The heated air or regeneration gas is then passed by conduit 18 and air distributor 20 into the lower portion of the dense bed of catalyst for flow upwardly therethrough under temperature conditions designed to effect substantial removal of coke and/or carbonaceous deposits from the catalyst as desired by burning. Regenerated catalyst particles are removed from the catalyst bed through withdrawal wells as shown. A first regenerated catalyst stream is removed by conduit 22 containing flow control valve 24 for introduction to the bottom or lower portion of riser 26. Riser 26 terminates at its upper end in this example in a catalyst separator 28 such as a cyclone separator. The hydrocarbon feed material to be converted in riser 26 is introduced to the lower portion thereof by conduit 30. In the arrangement shown, the hydrocarbon charge introduced by conduit 30 comprises the low AI (aromatic index) material or low additive carbon stocks. Such stocks include or are obtainable from light atmospheric gas oil, light vacuum gas oil, hydrotreated gas oil and any other suitable charge materials. The hydrocarbon charge in line 30 is heated as discussed above and then the heated charge is combined with hot regenerated catalyst to form a suspension of desired catalyst to oil ratio for passage upwardly through the riser at a cracking temperature and other operating conditions as discussed heretofore. A separate second catalyst stream 32 is withdrawn from regenerator 2 by conduit 32 containing valve 34 for passage of the hot regenerated catalyst to the bottom of riser 36.

Figure 4:
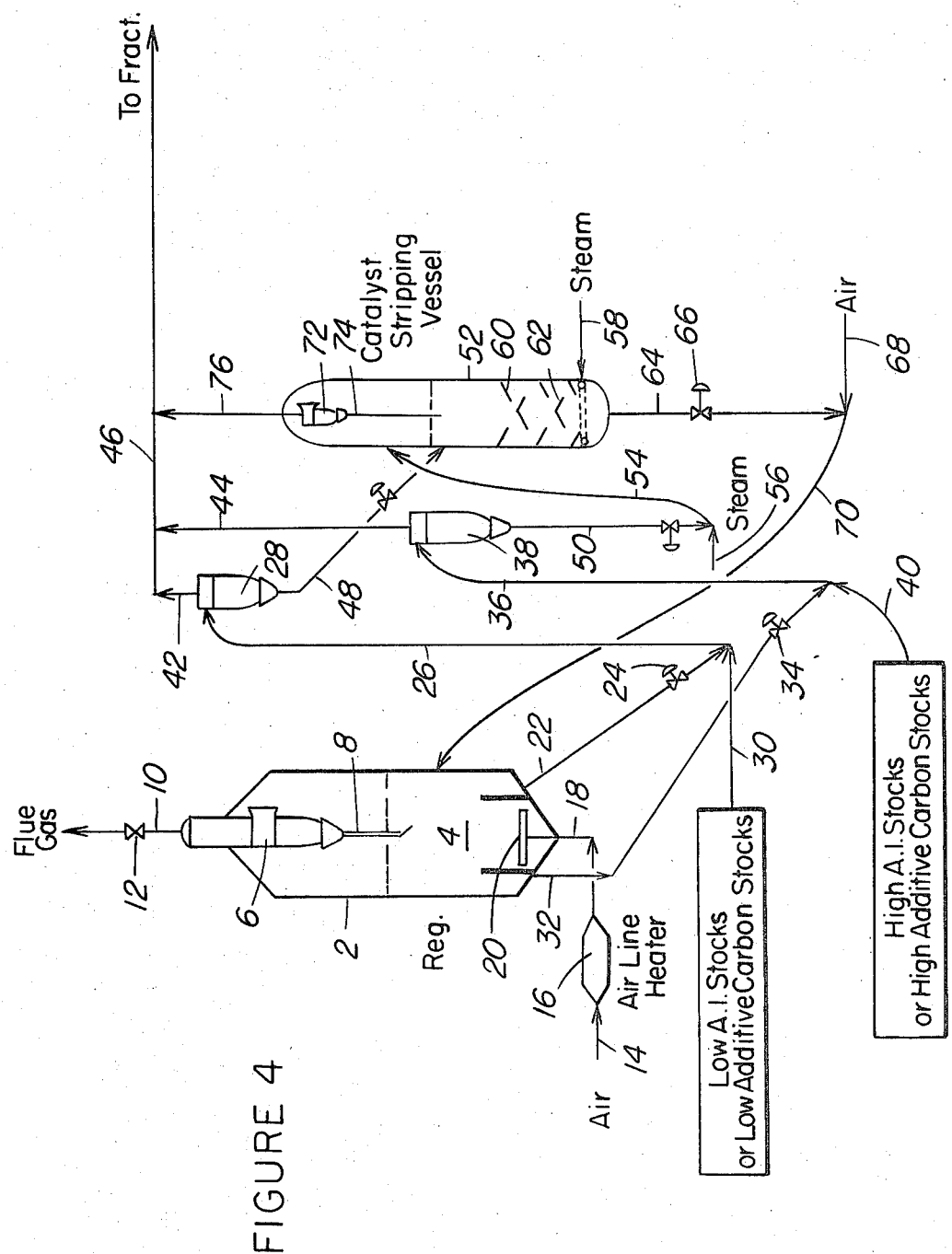

In the arrangement shown, riser 36 is provided for cracking hydrocarbon charge material introduced to the lower portion thereof by conduit 40. Conduit 40 is provided for introducing high aromatic index stocks above 15 AI either alone or in combination with high additive carbon stocks. Such high additive coke stocks may include heavy vacuum gas oil, heavy coker gas oil and other known charge stocks having such characteristics. The charge introduced by conduit 40 is combined with hot regenerated catalyst in an amount hereinbefore discussed to provide the particularly desired catalyst to oil relationship for flow upwardly through riser 36 and discharge into cyclone separator 38. Riser 36 may be the same or a different length than riser 26 or of the same or larger diameter than riser 26. Furthermore, there may be a plurality of the risers for processing each of the fractions. In separators 28 and 38 suspended catalyst is separated from hydrocarbon vapors before encountering a different atmosphere such as a moisture laden atmosphere or a higher temperature atmosphere, with the separated hydrocarbon vapor being removed from separator 28 by conduit 42 and from separator 38 by conduit 44. It is to be understood that separator 28 and 38 are purely diagrammatic and there may be a plurality of sequentially arranged separators required and used. In the arrangement shown the separated vapors are combined and passed by way of conduit 46 to a fractionator not shown. Catalyst separated from hydrocarbon vapors is removed by conduit 48 from separator 28 and conduit 50 from separator 38. In the arrangement of FIG. 4, separated catalyst in conduit 48 and provided with a catalyst flow control valve moves essentially by gravity from the cyclone separator as a relatively dense column of catalyst for discharge into a dense fluid bed of catalyst moving downwardly in stripping vessel 52. However, catalyst removed from separator 38 by conduit 50 and containing a catalyst flow control valve is combined with steam at the bottom of stand pipe 50 and passed as a suspension under dilute phase stripping conditions upwardly through riser conduit 54 for discharge into an upper portion of stripping vessel 52 either above or in the upper portion of the dense fluid bed of catalyst being stripped of hydrocarbon vapors. The stripping steam is introduced to the lower portion of riser 54 by conduit 56 for flow upwardly through the stripper and countercurrent to the downwardly moving catalyst phase. Thus, the catalyst employed to crack the high aromatic index charge stocks is subject to more than one stage of stripping which inclues a dilute and dense phase stripping operation. The catalyst-stripping gas suspension in riser 54 is separated by discharge into the upper portion of stripping vessel 52 and thereafter this stripped catalyst is combined with the catalyst introduced to the vessel by conduit 48 to form a relatively dense downwardly flowing fluid bed of catalyst moving through to stripping zone. Catalyst particles introduced to stripping vessel 52 are caused to move downwardly through the stripping vessel countercurrent to upwardly flowing stripping gas such as steam introduced to the lower portion of the stripping vessel by conduit 58. A plurality of downwardly sloping conical baffles 60 and 62 are provided in at least the lower portion of the stripping vessel 52 to provide a more tortuous path of flow for the catalyst and stripping gas for effecting the counter-current contact of catalyst particles with stripping gas. Stripped catalyst is withdrawn from the lower portion of stripping vessel 52 by conduit or standpipe 64 provided with flow control valve 66. The withdrawn stripped catalyst containing carbonaceous deposits remaining after the stripping operation is then combined with a carrier gas for transfer as a suspension into the regenerator. In the arrangement shown, conduit 68 is used to transfer the stripped catalyst through riser 70 discharging into regenerator 2. It is contemplated in this arrangement of effecting partial regeneration of the catalyst in riser 70 prior to discharge into the regenerator. It is also contemplated discharging the partially regenerated catalyst into the upper portion of the regenerator and above the upper level of the dense catalyst bed, in the upper portion of the dense fluid bed in the regenerator or in a lower portion thereof. The stripped hydrocarbon vapors and stripping gas passes through one or more cyclone separators such as separator 72 positioned in the upper portion of stripping vessel 52 to effect the recovery of suspended catalyst particles, from gasiform materials. Separated catalyst is passed to the bed of catalyst in the stripping vessel by dip leg 74 and gasiform material comprising steam and stripped hydrocarbons are removed by conduit 76 and combined with hydrocarbons in conduit 46 being passed through a fractionator not shown. In the arrangement of apparatus shown it is to be particularly noted that steam is restricted from contact with the catalyst hydrocarbon suspension until after the hydrocarbons have been separated from the catalyst in separators 28 and 38.

It is known from the literature that carbon-on-catalyst resulting from a cracking reaction is dependent upon the time the catalyst is exposed to oil vapors. Carbon on catalyst has been found to have a greater effect on the performance of zeolite or crystalline aluminosilicate cracking catalysts than in amorphous silica-alumina types of cracking catalyst. This is believed to be due to the fact that the crystaline component is only a relatively minor amount of the total solid but contributes on the other hand, essentially the major portion of the total activity and selectivity of the catalyst for conversion of the charge. Thus it is essential to observe and respect the role of coke make in a given hydrocarbon conversion system and its particular effect on the crystalline aluminosilicate catalyst used as herein described.

Thus in order to provide a better understanding of the scope and concept of this invention it is important to understand aromatic index rating, what the concept of high activity catalyst includes, the meaning associated with high additive coke and/or high coking charge stock.

Aromatic index is defined as the percent carbon atoms in aromatic structures in the gas oil feed. It is determined by the empirical method of Van Nes and Van Western as described in their book "Aspects of the Constitution of Mineral Oils," Elsevier Publishing Co., New York, 1951. The method involves correlating the composition of the oil with measurements of the refractive index, density and molecular weight of the oil.

A high activity catalyst is defined as one whose fluid activity index is greater than 60.0. The fluid activity index is defined as the percent vol. conversion of Light East Texas gas oil cracked under the following conditions:

| | |
|---|---|
| Temperature, °F. | 850 |
| Cat-to-oil, wt./wt. | 2.0 |
| Weight hourly space velocity | 6.0 |
| Process period, min. | 5.0 |
| Pressure, atm. | 1.0 |

The test is run in a fixed fluidized bed reactor containing 180 gms. of the test catalyst. The conversion is based on distilling gasoline with a 400 ASTM (EP) end point.

A high coking charge stock is intended to include any hydrocarbon stock having an aromatic index rating of 8 units or more greater than the virgin material from which it came and/or basic nitrogen content of 0.1 wt. percent greater than the "virgin" material herein considered as a relatively low coking charge stock by comparison.

The experimental program for determining the effect of segregated cracking, as reported in Table 1, was carried out on a small-scale continuous FCC pilot plant. Briefly, it consisted of a catalyst hopper in which catalyst was preheated to a temperature of 1200° F. and a 30-foot length of 0.250" ID tubing divided into six equal lengths which were immersed in molten salt to maintain reaction temperature. The feed stock was preheated to a temperature so that when mixed with the catalyst on adiabatic mix temperature of 1000° F. was obtained. The reaction mixture flowed through the tubing as a dilute phase and the total oil rate was set so that oil residence time was about 4 seconds. The reaction mixture entered a stripper where the catalyst was disengaged from the oil vapor and stripped of entrained hydrocarbons. Oil vapors were collected and analyzed by conventional techniques. Different conversion levels were obtained by varying the catalyst to oil weight ratio, while holding mix temperature (reaction temperature) and oil contact time constant. A series of runs was made with the virgin feed plus coker and recycle stock to simulate a conventional unit in which all of the feed was cracked in one riser; a series of runs was made with the virgin feed and another series with the coker and recycle stock. The yield data was plotted and the combined yields for segregated cracking (two risers) were correlated and compared to the case for the conventional single riser.

TABLE 1

| | Total mix single riser | Segregated feed same operating cond. | Segregated feed same conversion |
|---|---|---|---|
| Conversion, percent volume | 80 | 82 | 80 |
| C$_5$ + gasoline, percent volume | 58.8 | 62.5 | 61.7 |
| Total C$_4$, percent volume | 19.2 | 19.2 | 18.6 |
| Dry gas, percent weight | 7.9 | 7.5 | 7.4 |
| Coke, percent weight | 6.0 | 6.0 | 5.7 |

In an article "Carbon Formation in Catalytic Cracking," IEC 37(4), pages 318–322, 1945, Voorhies used the following equation to correlate laboratory experimental data for coke formation in cracking reactions:

$$C_{cat} = kt^n \qquad (1)$$

where $C_{cat}$ = carbon on catalyst
$k$ = constant related to the temperature, oil partial pressure, and the feedstock
$t$ = reaction time in seconds
$n$ = constant related to the catalyst type This equation is generally correct for light feedstocks that are low in basic nitrogen. However, for heavier feedstocks it has been found necessary to modify the equation as follows:

$$C_{cat} = kt^n + C_{add}/C/O \qquad (2)$$

where $C_{add}$ = additive carbon
$C/O$ = catalyst-to-oil ratio

This equation now incorporates the finding that a certain portion of the carbon found deposited on the catalyst surface is a property of the feed stock and completely independent of the catalyst type.

EXPERIMENTAL DETERMINATION OF ADDITIVE CARBON

The technique for determining the additive carbon factor of a given hydrocarbon charge stock is obtained by making at least two experiments at fixed reaction times with predetermined cat-to-oil ratios and measuring the coke make based on fresh feed.

Rearranging Equation 2 shows the significance of this:

$$C_{cat} = kt^n + \frac{C_{add}}{C/O} \qquad (2)$$

multiplying through by $C/O$ gives:

$$C/O \times C_{cat} = C/O \times (kt^n) + C_{add} \qquad (3)$$

however, the quantity $C/O \times C_{cat}$ is equal to the yield of carbon on fresh feed and since time in the experiment is equal to a constant, Equation 3 may be written:

$$C_{FF} = K''C/O + C_{add} \qquad (4)$$

This equation is in the form of a straight line and if a plot of $C_{FF}$ vs. $C/O$ is made, the y-intercept will be the $C_{add}$. FIG. 1 illustrates graphically the relationship for obtaining the additive carbon factor herein discussed.

CORRELATIVE METHOD

Figure 2:
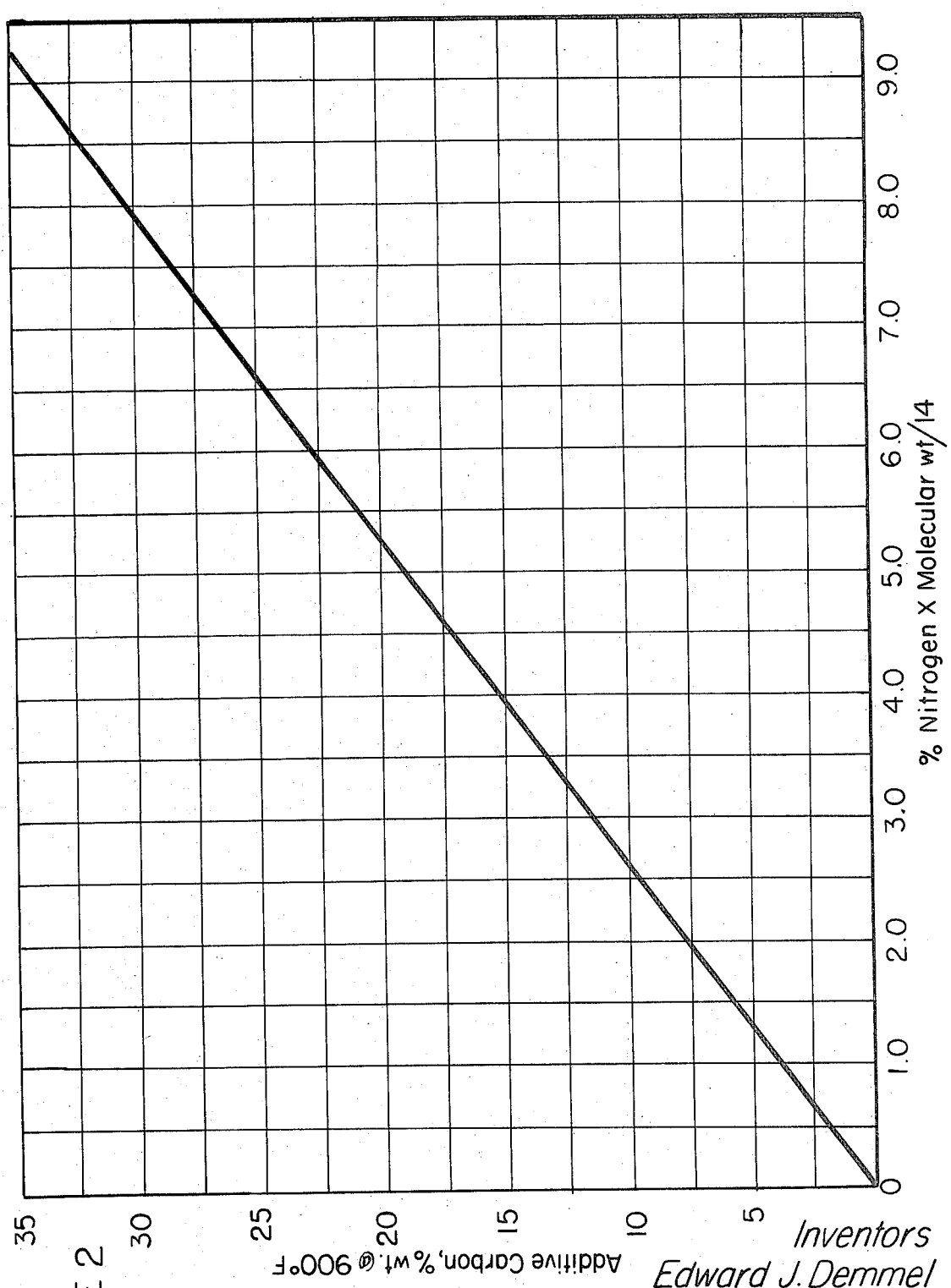

It has been found that such data may also be correlated with the basic-nitrogen content of the feed stock and the molecular weight. This correlation is shown in FIG. 2. The correlating parameter is calculated as follows:

$$\text{Percent } \frac{\text{Nitrogen}}{14} \times \text{Average Molecular Weight of Feed}$$

Figure 3:
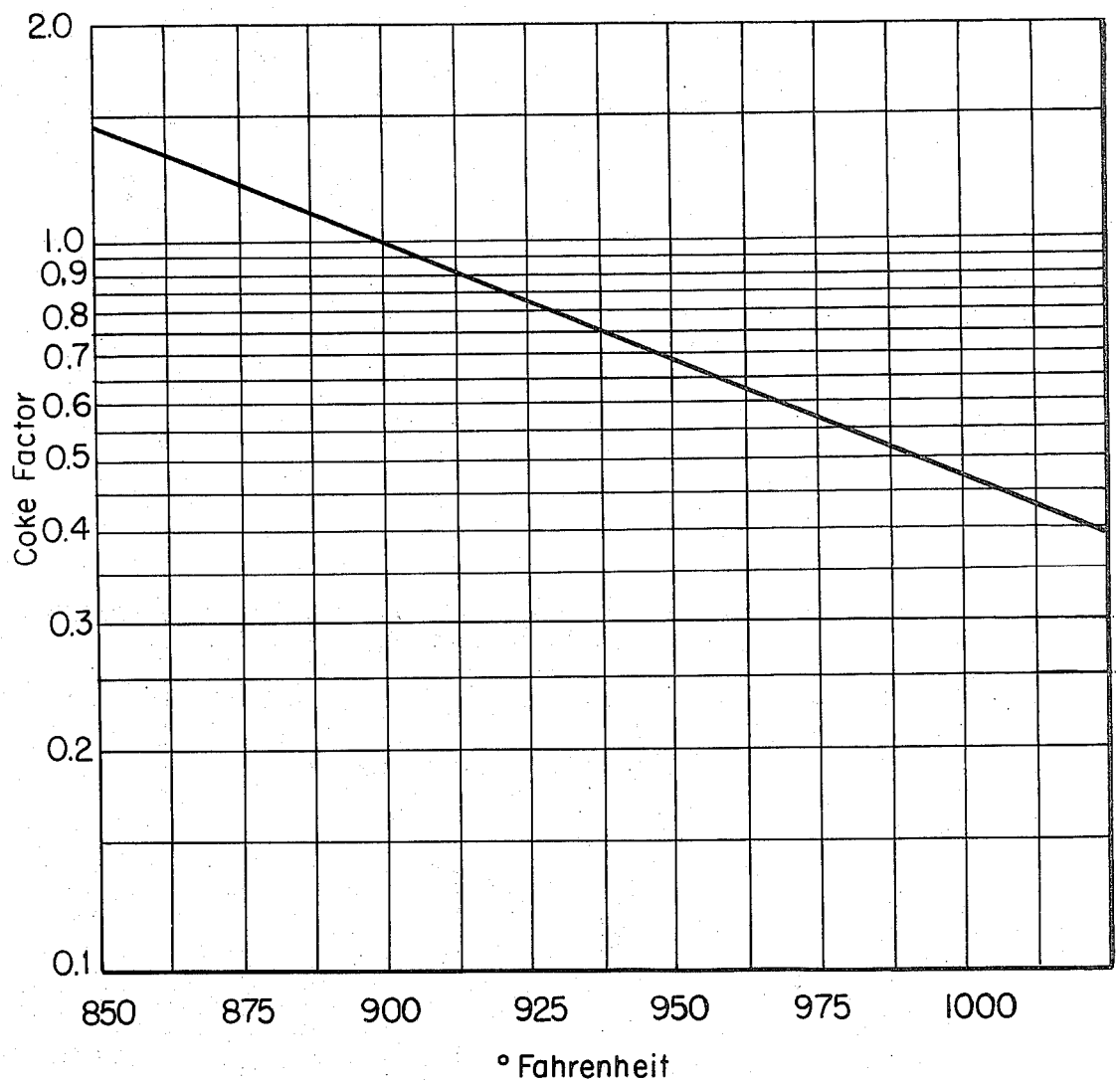

The only process variable that has been found which affects the yield of additive carbon is temperature. This effect is shown in FIG. 3. The method of calculation is through the relationship:

$$\text{Add } C_T = \text{Add } C_{900°} \times F$$

where

Add $C_T$ = additive carbon at temperature T
Add $C_{900°F}$ = add carbon at 900° F (from FIG. 2)
F = temperature factor from FIG. 3.

Having thus provided a general discussion of the invention and specific embodiments pertaining thereto, it is to be understood that no undue restrictions are to be imposed by reasons thereof except as defined in the following claims.

We claim:

1. A method for converting a crude oil to gasoline boiling range products which comprises:
   preparing a first hydrocarbon feed fraction having an aromatic index rating less than 15 and a second hydrocarbon feed fraction having an aromatic index rating greater than 15, said first hydrocarbon feed fraction obtained by vacuum and atmospheric distillation of said crude oil,
   separately cracking said first and second hydrocarbon feed fractions in first and second riser conversion zones in the presence of freshly regenerated high activity crystalline aluminosilicate cracking catalyst,
   said first hydrocarbon feed cracking step being effected at a catalyst to oil ratio in the range of 4–8/1 and an elevated temperature in the range of 880 to 1050° F. to provide a hydrocarbon contact time within the range of 2 to 6 seconds at a space velocity within the range of 8 to 50 v./v./hr.,
   said second hydrocarbon feed cracking step being effected at a catalyst to oil ratio greater than 10 and a temperature within the range of 925 to 1100° F. under conditions providing a hydrocarbon space velocity within the range of 20 to 100 v./v./hr.,
   cyclonically separating catalyst from hydrocarbon vapors discharged from each riser conversion zone in a moisture free atmosphere and passing catalyst separated from said first riser conversion zone directly to a dense fluid bed of catalyst being stripped in a stripping zone,
   passing catalyst separated from hydrocarbon vapors discharged from said second riser conversion zone upwardly through a riser stripping zone discharging into said stripping zone above said dense fluid bed of catalyst therein,
   combining hydrocarbon vapors separated from said first and second riser conversion zones with stripped hydrocarbon vapors and stripping gas removed from said stripping zone and
   passing stripped catalyst to a catalyst regeneration zone.

2. The method of claim 1 wherein the cracking temperatures employed for converting said second hydrocarbon fraction are generally higher than those employed for cracking said first hydrocarbon fraction.

3. The method of claim 1 wherein the fluid suspensions are separately separated after a conversion contact time not exceeding 6 seconds under atmospheric conditions not departing significantly from the suspension atmospheric conditions.

4. The method of claim 1 wherein the hydrocarbon-catalyst contact residence time is at least 3 seconds for the first hydrocarbon fraction and the catalyst to oil ratio employed is much higher for converting the second hydrocarbon fraction than that employed for converting the first hydrocarbon fraction.

5. The method of claim 1 wherein hydrocarbon fractions of high additive coke characteristics are converted using catalyst/oil ratios greater than 10 at temperature conditions up to 1100° F. and space velocity conditions which exclude a catalyst/oil residence contact time in excess of 6 seconds.

6. The method of claim 1 wherein the first hydrocarbon fraction is preheated to a temperature within the range of 600 to 850° F. before forming a suspension with the catalyst for passage through the first riser conversion zone.

7. The method of claim 1 wherein the second hydrocarbon fraction is preheated to a temperature within the range of 100 to 500° F. before forming a suspension with the catalyst passed through said second riser conversion zone.

References Cited

UNITED STATES PATENTS

| Number | Date | Name | Class |
|---|---|---|---|
| 3,392,110 | 7/1968 | Payne | 208—120 |
| 3,661,799 | 5/1972 | Cartmell et al. | 252—417 |
| 3,679,576 | 7/1972 | McDonald | 208—74 |
| 3,654,137 | 4/1972 | Dober et al. | 208—87 |
| 3,630,886 | 12/1971 | Deed et al. | 208—96 |
| 3,384,573 | 5/1968 | Gorring | 208—113 |
| 3,617,497 | 11/1971 | Bryson et al. | 208—80 |
| 3,448,037 | 6/1969 | Bunn et al. | 208—164 |
| 3,536,609 | 10/1970 | Stine et al. | 208—72 |
| 3,617,496 | 11/1971 | Bryson et al. | 208—280 |
| 3,619,415 | 11/1971 | Jones et al. | 208—164 |
| 3,650,946 | 3/1972 | Mournine | 208—164 |
| 3,355,380 | 11/1967 | Luckenbach | 208—153 |
| 3,440,020 | 4/1969 | Owen | 23—288 S |

DELBERT E. GANTZ, Primary Examiner

G. E. SCHMITKONS, Assistant Examiner

U.S. Cl. X.R.

208—78, 120, 164